ACTUATOR MECHANISM FOR A SWITCH

Filed April 12, 1963 2 Sheets-Sheet 1

Inventors.
Sheldon Lee Pastor.
Robert M. Stahl.
By. Zabel, Baker, York, Jones & Dithmar
Attorneys.

May 31, 1966 S. L. PASTOR ET AL 3,254,187

ACTUATOR MECHANISM FOR A SWITCH

Filed April 12, 1963 2 Sheets-Sheet 2

Inventors.
Sheldon Lee Pastor.
Robert M. Stahl.

By. Zabel, Baker, York, Jones & Dithmar

Attorneys.

United States Patent Office 3,254,187
Patented May 31, 1966

3,254,187
ACTUATOR MECHANISM FOR A SWITCH

Sheldon Lee Pastor, St. Paul, Minn., and Robert M. Stahl, Argo, Ill., assignors to Minnesota Mining and Manufacturing Company, St. Paul, Minn., a corporation of Delaware Filed Apr. 12, 1963, Ser. No. 272,789
3 Claims. (Cl. 200—153)

This invention relates to an actuator mechanism for a switch, and more particularly to such a mechanism wherein the switch is located at a distance from its associated actuator element.

The actuator mechanism of the invention is adapted, for example, for use in magnetic recording and reproducing apparatus wherein the actuator element is located in accessible position on the exterior of a housing or case and the switch is mounted within the case at substantial distance from the actuator element. The mechanism includes the actuator element itself, the movable element of the switch and an adjustable linkage arrangement interconnecting the actuator and switch elements.

Tape recording and reproducing apparatus, as well as other electrical and mechanical apparatus, include various components which are fabricated on a sub-assembly basis and thereafter mounted on or enclosed within a case or other supporting structure. The components are produced with varying tolerances, and varying tolerances are involved in mounting the components on or in the case. In such apparatus there are instances wherein more or less precise mechanical connections are provided between elements of two or more sub-assembly components. The present mechanism constitutes a mechanical connection between two such elements and provides an adjustability feature that eliminates the need, as far as the connection is concerned for close tolerances in the component sub-assemblies and in mounting the sub-assemblies on or in the supporting structure.

One object of this invention, therefore, is to provide an actuator mechanism for a switch wherein an actuator element is mounted on one component sub-assembly and the switch is mounted on another component sub-assembly, the mechanism including fine adjustment means for synchronizing the relative operational positions of the actuator element and the movable element of the switch.

Another object is to provide an actuator mechanism that may be adjusted to compensate for certain manufacturing irregularities, thereby affording significant manufacturing economies.

Another object is to provide in magnetic recording and reproducing apparatus an actuator mechanism for a remotely located switch that serves to condition the switch for effective control of a demagnetization system such as shown in Claras U.S. Patent No. 2,682,578.

Another and more detailed object is to provide an actuator mechanism for a remotely located switch wherein the actuator element is rotatable on a horizontal axis and the movable switch element has back and forth movement on a straight path at right angles to the axis of the actuator element.

Other objects, advantages and details of the invention will be apparent as the description proceeds, reference being had to the accompanying drawings wherein one form of the invention is shown. It is to be understood that the description and drawings are illustrative only, and that the scope of the invention is to be measured by the appended claims.

Figure 1:
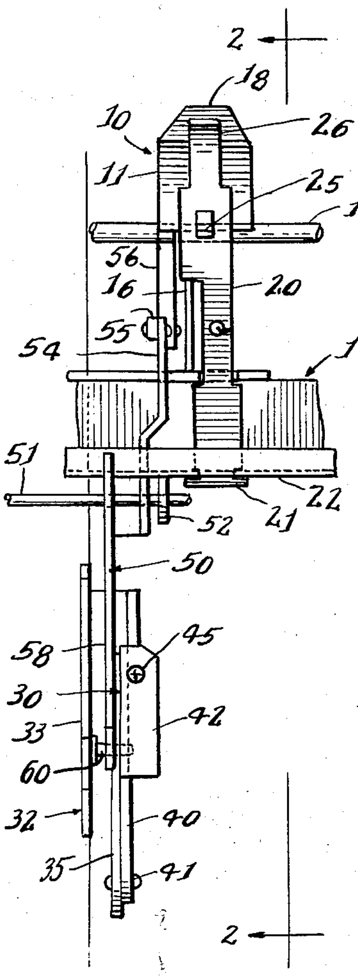
FIG. 1 is a front elevational view of actuator mechanism embodying the invention. A commercial form of the mechanism may comprise duplicate mechanisms of the type shown in FIG. 1, one serving to actuate the movable element in one portion of a switch and the other serving to actuate the movable element in another portion of the same switch.
Figure 2:
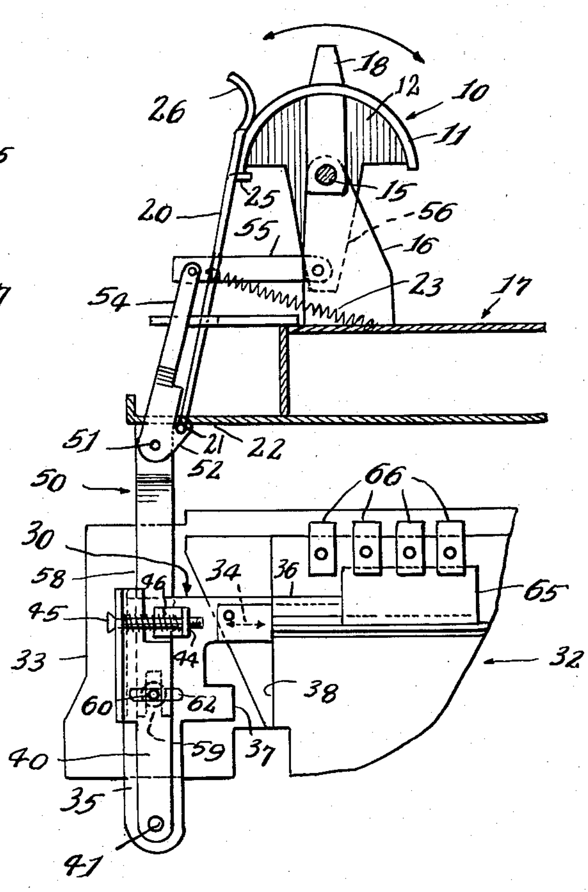
FIG. 2 is a side elevational view, partly in section, on line 2—2 of FIG. 1.

Referring to the drawings, and particularly to FIGS. 1 and 2, the actuator mechanism of the invention includes a movable actuator 10 designed for manual manipulation. As illustrated, actuator 10 has a semicylindrical portion 11 secured to or integral with vertically disposed bearing plate 12 (FIG. 2).

Plate 12 is journalled for rotation on a horizontal first shaft 15 carried by one or more supports 16 extending upwardly from a fixed base 17. A finger tab 18 on semicylindrical portion 11 permits convenient rotation of actuator 10 on shaft 15. As will be seen, actuator 10 is illustrated in its central or "neutral" rotary position.

An index means is provided for establishing a reference setting of actuator 10. In the form of the invention shown, this index means comprises a biased retractable arm 20 hinged at 21 (FIG. 1) to portion 22 of base 17. Arm 20 extends from base portion 22 upwardly into proximity with actuator 10. A tension spring 23 (FIG. 2) between arm 20 and base 17 biases arm 20 into engagement with semicylindrical portion 11 of actuator 10. A stop tang 25 extends rearwardly from arm 20 in position to be engaged by the left hand lower edge of actuator portion 11 (FIG. 2). The upper end of arm 20 curves away from actuator 10 to provide a portion 26 for manual manipulation of the arm.

Still referring to FIG. 2, actuator 10 is shown at its index position with portion 11 in engagement with stop tang 25, thereby preventing further rotation of actuator 10 in counterclockwise direction. When it is desired to rotate actuator 10 to its counterclockwise position, arm 20 is moved manually away from actuator 10, thereby removing stop tang 25 from portion 11. In the magnetic recording and reproducing apparatus for which subject mechanism was designed, actuator 10 is rotated in counterclockwise direction from the neutral position shown in FIG. 2 to establish electrical connections in the associated switch for the recording function. Movement in counterclockwise direction from the neutral position establishes electrical connection for the reproducing function.

Figure 3:
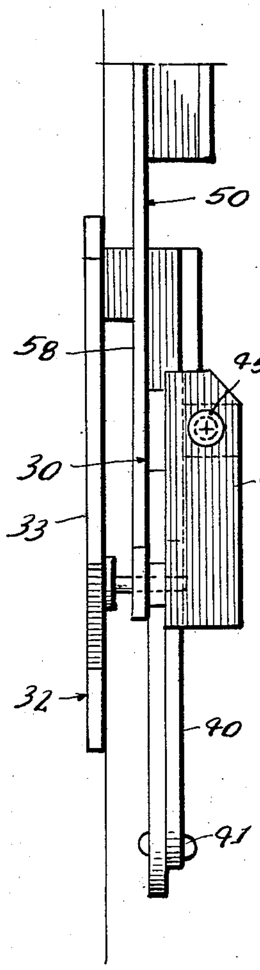
FIG. 3 is an enlarged elevational view of the lower portion of the mechanism shown in FIG. 1.
Figure 4:
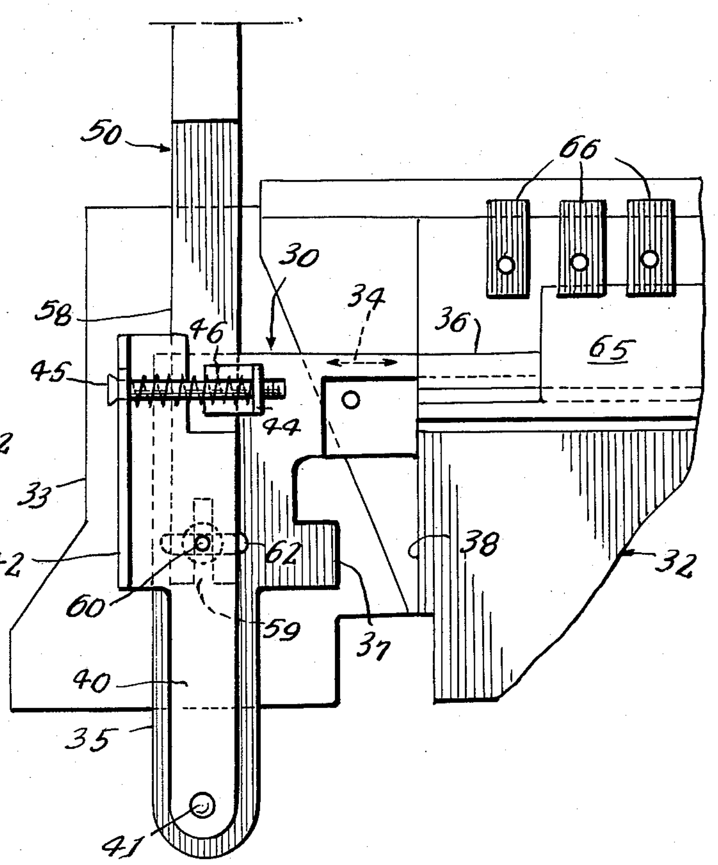
FIG. 4 is an enlarged view of the lower portion of the mechanism shown in FIG. 2.

Referring now to the lower portions of FIGS. 1 and 2 and to FIGS. 3 and 4, the mechanism of the invention also includes a movable switch element 30 that forms part of a switch 32. The latter is shown in fragmentary form as most details thereof are not part of this invention. Sufficient to say at this time that switch 32 includes a vertically disposed mounting plate 33 that supports the various parts of the switch. Movable element 30 and parts directly connected thereto are the only parts of switch 32 necessary for an understanding of the invention. Switch element 30, shown in central or neutral position in FIGS. 2 and 4, is adapted to move back and forth in the directions indicated by arrows 34.

As illustrated, movable switch element 30 is generally F-shaped, when viewed in elevation, as shown in FIGS. 2 and 4. It comprises vertical stem 35, upper arm 36 (on which movable switch contacts are mounted) and intermediate arm 37. The latter is adapted to engage an abutment or stop 38 on mounting plate 33 to limit movement of element 30 to the right.

An adjustment member 40 is movably mounted on stem 35 of movable switch element 30. In the form of the invention shown, adjustment member 40 is pivotally connected to switch element 30, the pivotal axis being established by pin 41.

Adjustment member 40 has a flange 42, best shown in FIGS. 1 and 3, extending at right angles to the plane of the member. Movable switch element 30 also has a flange or tab 44 that extends at right angles to the element in spaced, parallel relation with flange 42 on adjustment member 40. A headed bolt 45 extends through flange 42 of adjustment member 40 and is threaded into tab 44 of movable switch element 30. A compression spring 46 surrounds bolt 45 in the space between flange 42 and tab 44.

As will be understood, bolt 45 is tightened or loosened to vary the angular relationship between adjustment member 40 and stem 35 of movable switch element 30. This is the adjustment that enables the movable switch element to be set at the position desired when actuator 10 is indexed by engagement with stop tang 25 on retractable arm 26, as will be seen.

The actuator mechanism of the invention also includes means interconnecting actuator 10 and adjustment member 40 for synchronous movement. In the form of the invention shown, this interconnecting means includes an elongated lever 50 pivoted on a fixed second shaft 51 mounted in spaced relation below base portion 22 by one or more supports 52.

Upper portion 54 of lever 50 is pivotally connected to one end of a link 55, the other end of link 55 being pivotally connected to an arm 56 of actuator 10. As best shown in FIG. 2, arm 56 may be integral with actuator plate 12. Lower portion 58 of lever 50 has an end recess 59 that receives a headed pin 60 mounted on adjustment member 40. The head of pin 60 may bear against mounting plate 33 of switch 32, as shown.

In the form of the invention shown, pin 60 of adjustment member 40 extends through an elongated slot 62 in movable switch member 30 and into recess 59 of lower lever portion 58. With this arrangement, when lever 50 is rotated on shaft 51 in response to rotation of actuator 10, lower lever portion 58 moves pin 60 and associated adjustment member 40. The latter, of course, is secured to movable switch element 30 by pivot pin 41, bolt 45 and spring 46.

Completing the description and by way of example, upper arm 36 of movable switch element 30 carries one or more conducting contacts 65 adapted to establish connection between one or more fixed switch terminals 66. Referring to FIG. 2, when the illustrated movable switch member 30 is in central or neutral position, as shown, conducting contact 65 interconnects the right hand three terminals 66. When movable switch element 30 is positioned to the right as a result of rotating actuator 10 in clockwise direction, contact 65 will establish connection only between the two right hand terminals 66. When movable switch element 30 is positioned to the left as a result of withdrawing retractable biased arm 26 and rotating actuator 10 in counterclockwise direction, contact 65 establishes connection between the three left hand switch terminals 66.

With actuator 10 adapted to be mounted on one subassembly component and switch 32 adapted to be mounted on another at substantial distance away, it is difficult, in the absence of subject mechanism, to correlate actuator 10 with movable switch element 30, particularly when economical mass production tolerances are used in manufacture and assembly. This difficulty is eliminated by the present invention wherein simple adjustment of readily accessible bolt 45 enables switch element 30 to be positioned with precision for any reference setting of actuator 10. Should the positioning vary with extended use or abuse, readjustment easily can be made.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. Actuator mechanism for a switch comprising:
a base;
a first shaft mounted on said base;
an actuator rotatably mounted on said shaft;
biased retractable means limiting rotation of said actuator in one direction;
a second shaft mounted on said base;
a lever pivoted on said second shaft;
a link pivotally connected to said actuator and one end of said lever;
a longitudinally movable switch element located remotely from said actuator, said switch element having an elongated slot extending in the direction of movement;
an adjustment member pivotally connected to said switch element with the pivotal axis at the connection in spaced relation to said elongated slot, said adjustment member overlying said slot;
a pin mounted on said adjustment member and projecting through said slot;
the other end of said lever recessed and embracing said pin; and
means varying the angular relationship between said switch element and said adjustment member in an adjusting manner, whereby said switch element may be adjusted longitudinally to the position desired wehn said actuator is in the rotated position established by said biased retractable means.

2. Actuator mechanism for a switch comprising:
a first shaft;
an actuator rotatably mounted on said shaft;
retractable stop means limiting rotation of said actuator in one direction;
a second shaft;
a lever pivoted on said second shaft;
a link pivotally connected to said actuator and one end of said lever;
a longitudinal movable switch element located remotely from said actuator;
an adjustment member pivotally connected to said switch element;
a pin connecting said adjustment member and the other end of said lever; and
means varying the angular relationship between said switch element and said adjustment member whereby said switch element may be adjusted to the position desired when said actuator is in the position established by said stop means.

3. Actuator mechanism for a switch comprising:
a rotatable actuator;
an index means establishing a reference setting for said actuator;
a longitudinally movable switch element located remotely from said actuator;

an adjustment member pivotally connected to said switch element;

a pin mounted on said adjustment member;

pivoted link and lever means connecting said actuator and said pin for synchronous movement; and means varying the angular relationship between said switch element and said adjustment member to establish desired position of said switch element when said actuator has reference setting.

References Cited by the Examiner

UNITED STATES PATENTS

| | | | |
|---|---|---|---|
| 1,411,300 | 4/1922 | Puerner | 200—16 |
| 2,517,052 | 8/1950 | Swinehart. | |
| 3,134,880 | 5/1964 | Murphy | 200—170 |

KATHLEEN H. CLAFFY, *Primary Examiner.*

BERNARD A. GILHEANY, *Examiner.*

DAVID SMITH, *Assistant Examiner.*